United States Patent
Lyons et al.

(10) Patent No.: US 8,640,244 B2
(45) Date of Patent: Jan. 28, 2014

(54) DECLARED ORIGIN POLICY

(75) Inventors: Matthew G. Lyons, Palatine, IL (US);
Randal J. Ramig, Seattle, WA (US);
Anil Dhawan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1264 days.

(21) Appl. No.: 12/147,696

(22) Filed: Jun. 27, 2008

(65) Prior Publication Data

US 2009/0328235 A1    Dec. 31, 2009

(51) Int. Cl.
*G06F 21/00* (2013.01)

(52) U.S. Cl.
USPC ...... 726/25; 726/9; 726/22; 726/27; 713/168; 713/186; 709/227; 705/14

(58) Field of Classification Search
USPC ............................................. 726/2, 3, 11, 25
See application file for complete search history.

(56) References Cited

U.S. PATENT DOCUMENTS

| | | | |
|---|---|---|---|
| 5,805,820 A * | 9/1998 | Bellovin et al. ............... 709/225 |
| 7,243,369 B2 * | 7/2007 | Bhat et al. .......................... 726/6 |
| 7,394,809 B2 * | 7/2008 | Kumar et al. ................... 370/392 |
| 7,577,995 B2 * | 8/2009 | Chebolu et al. ................. 726/26 |
| 2002/0133720 A1 | 9/2002 | Sherman et al. .............. 713/201 |
| 2003/0163567 A1 | 8/2003 | McMorris et al. ............ 709/225 |
| 2006/0195609 A1 | 8/2006 | Han ............................... 709/245 |
| 2006/0253446 A1 | 11/2006 | Leong et al. ...................... 707/9 |
| 2007/0022202 A1 * | 1/2007 | Finkle et al. ................... 709/227 |
| 2007/0094351 A1 * | 4/2007 | Kalish et al. ................... 709/218 |
| 2007/0107057 A1 * | 5/2007 | Chander et al. .................. 726/22 |
| 2007/0150524 A1 * | 6/2007 | Eker et al. ...................... 707/203 |
| 2008/0256536 A1 * | 10/2008 | Zhao et al. ......................... 718/1 |
| 2008/0263650 A1 * | 10/2008 | Kerschbaum ...................... 726/9 |
| 2008/0320567 A1 * | 12/2008 | Shulman et al. ................... 726/4 |

FOREIGN PATENT DOCUMENTS

CN    101079042 A    11/2007

OTHER PUBLICATIONS

International Search Report dated Dec. 30, 2009 cited in Application No. PCT/US2009/048666.
Chinese Second Office Action dated Oct. 12, 2013 cited in Application No. 200980134285.5, 12 pgs.

* cited by examiner

*Primary Examiner* — Morshed Mehedi
(74) *Attorney, Agent, or Firm* — Merchant & Gould

(57) ABSTRACT

A declared origin policy may be provided. First a plurality of records comprising addresses that an application is allowed to access may be received. The received plurality of records may be placed in a manifest. Then, a request containing an address may be received and compared to the plurality of records in the manifest. Access to the address may be allowed when one of the plurality of records in the manifest matches the address or when an ambiguity is encountered as to whether the one of the plurality of records in the manifest matches the address. Access to the address may be denied when none of the plurality of records in the manifest matches the address. Moreover, any request to change any of the plurality of records in the manifest may be denied when the application is updated, uninstalled, or reinstalled.

16 Claims, 3 Drawing Sheets

DECLARED ORIGIN POLICY

BACKGROUND

Same origin policy (SOP) is a security measure for client-side scripting that prevents a document or script loaded from one "origin" from getting or setting properties of a document from a different origin. With SOP, a browser should not trust content loaded from arbitrary websites. Web pages run, in SOP, within a "sandbox" and are prevented from accessing resources from other origins. Without this protection, a malicious web page may compromise the confidentiality or integrity of another web page.

The term "origin" is defined using the domain name, protocol, and port. Two pages belong to the same origin if these three values are the same. To illustrate, the following Table 1 gives examples of origin comparisons to the URL "http://www.example.com/dir/page.html". The column labeled "Outcome" illustrates the result of SOP for a corresponding URL.

TABLE 1

| URL | Outcome | Reason |
| --- | --- | --- |
| http://www.example.com/dir2/other.html | Success | Same protocol and host |
| http://www.example.com/dir/inner/other.html | Success | Same protocol and host |
| http://www.example.com:81/dir2/other.html | Failure | Same protocol and host but different port |
| https://www.example.com/dir2/other.html | Failure | Different protocol |
| http://en.example.com/dir2/other.html | Failure | Different host |
| http://example.com/dir2/other.html | Failure | Different host |

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A declared origin policy may be provided. First a plurality of records comprising addresses that an application is allowed to access may be received. The received plurality of records may be placed in a manifest. Then, a request containing an address may be received and compared to the plurality of records in the manifest. Access to the address may be allowed when one of the plurality of records in the manifest matches the address or when an ambiguity is encountered as to whether the one of the plurality of records in the manifest matches the address. Access to the address may be denied when none of the plurality of records in the manifest matches the address. Moreover, any request to change any of the plurality of records in the manifest may be denied when the application is updated, uninstalled, or reinstalled.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
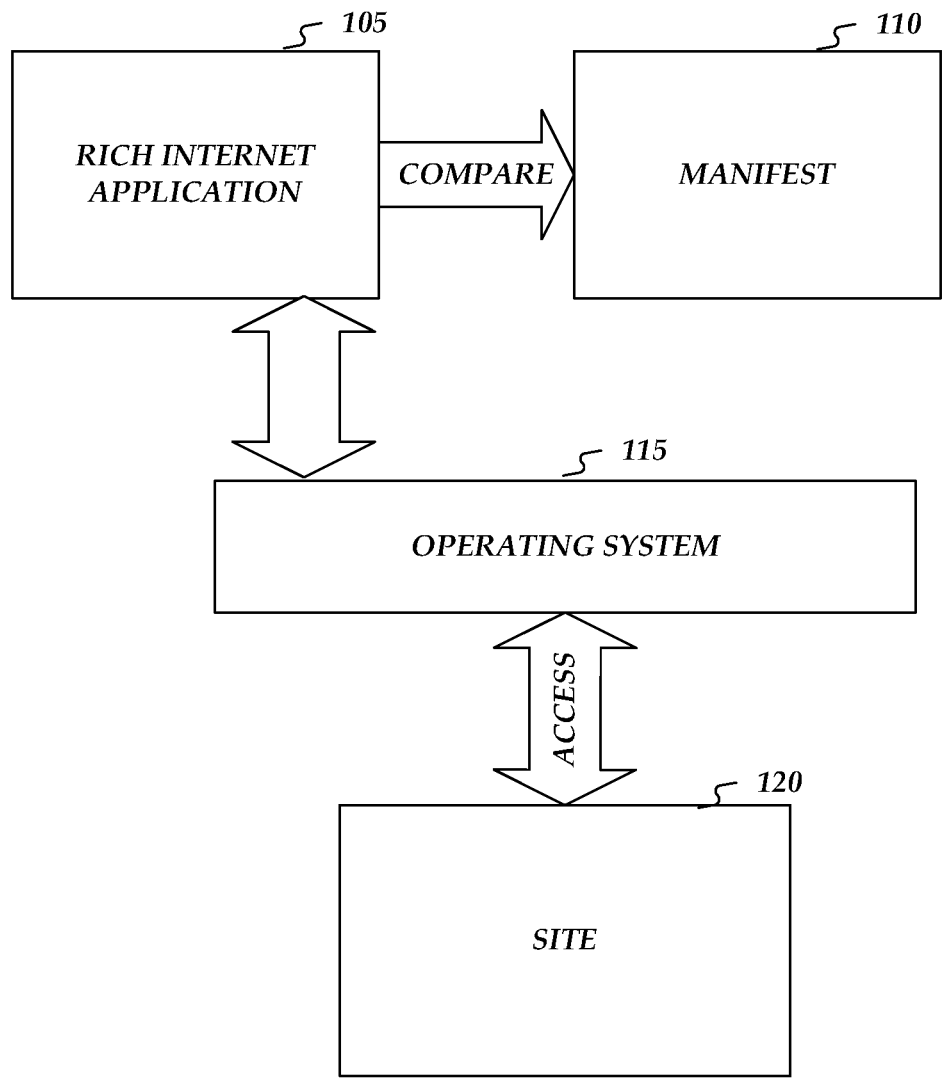
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Conventional web browsers try to control what sites script can access using the SOP security policy. SOP tries to prevent an attacker from impersonating a legitimate user by sending HTTP requests in the user context or by impersonating a legitimate website by pretending to be the legitimate website. SOP has numerous security problems in addition to being difficult for developers trying to build web page mash-ups using web services from multiple sites.

Rich Internet applications (RIAs) may comprise web applications that have traditional desktop application features and functionality. RIAs may transfer processing necessary for a user to interface to a web client, but keep the bulk of the data (i.e. maintaining the state of the program, the data, etc.) back on an application server. RIAs may run in a web browser, may not require software installation, and may run locally in a secure environment such as a sandbox. RIAs may comprise local copies of web pages that can perform different functions based on locally obtained information. SOP may be a problem for RIAs in that an RIA web page may not be from the same site of a web service the RIA web page uses. SOP may block most functions that RIAs may do. If SOP was completely removed without some replacement, then a bug in an RIA or a compromised host providing a web service may use the RIA to attack an end user. For example, a compromised host may redirect the RIA to send authentication information to an attacker's host. Thus, an alternative to SOP for RIAs is desirable.

FIG. 1 shows a block diagram of an operating environment 100. As shown in FIG. 1, operating environment 100 may include a rich Internet application (RIA) 105, a manifest 110, an operating system 115, and a site 120. Consistent with embodiments of the present invention, manifest 110 may list all files that are part of RIA 105. In manifest 110, RIA 105 may also list all sites (e.g. site 120) that RIA 105 can access. Manifest 110 may contain, for example, host names, protocols, and ports allowed by RIA 105. If anything in RIA 105's process (script, controls used by the web page, malicious code that an attacker got onto a system, etc.) attempted to contact (i.e. requested) site 120, operating system 115 may block the request if site 120 is not listed in manifest 110. However, if anything in RIA 105's process attempted to contact (i.e. requested) site 120, operating system 115 may allow the request if site 120 is listed in manifest 110.

Consistent with embodiments of the present invention, a developer may declare, in manifest 110, all sites that may be accessible by RIA 105 by, for example, site name, protocol, or port (with wildcards allowed for each). No network connections to any other hosts or sites not declared in manifest 110 may be allowed in a process (e.g., downloading images pointing frames to different URLs, ActiveX controls doing custom functions, etc.). The site list in manifest 110 may not be changed by going through an update or uninstall/reinstall process, for example.

Embodiments of the present invention may have several benefits over SOP. For example, SOP does not block all network connections, only certain connection types coming from scripts. Thus, malicious code can use non-standard ways to contact other servers. The declared origin policy consistent with embodiments of the invention may block all network connections to undeclared hosts, regardless of their source. SOP may block normal ways for scripts to contact web services, so developers may be forced to use unreliable or difficult ways to avoid the protections. The declared origin policy consistent with embodiments of the invention may allow developers to contact whatever web services they choose without restriction. SOP may be implemented in different ways by different browsers and is not always clear how it works. The declared origin policy consistent with embodiments of the invention may be simple and straightforward.

Moreover, embodiments of the present invention may have several benefits over crossdomain.xml. For example, Crossdomain.xml support may be limited to Adobe Flash, so normal web browsing scenarios may be excluded. The declared origin policy consistent with embodiments of the invention may apply to any technology used in a browser. Furthermore, Crossdomain.xml files may change on servers without customer interaction, so it may not be possible for clients to have a clear grasp of what might be allowed from one day to the next. The declared origin policy consistent with embodiments of the invention may store a host list (e.g. manifest 110) on a client, so device administrators may have a clear idea of where the client is allowed to connect.

Figure 2:
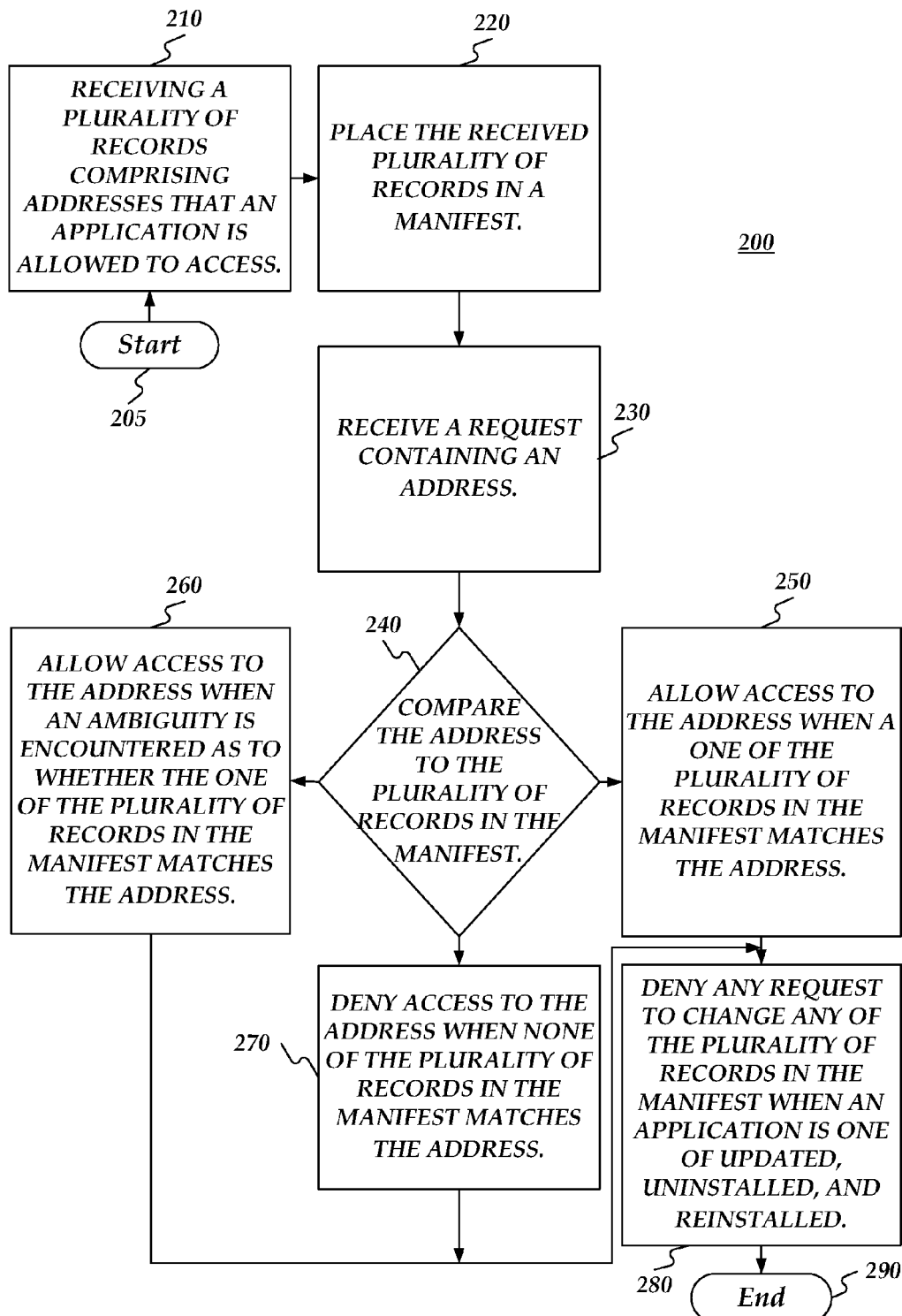
FIG. 2 is a flow chart of a method for providing a declared origin policy.

FIG. 2 is a flow chart setting forth the general stages involved in a method 200 consistent with embodiments of the invention for providing a declared origin policy. Method 200 may be implemented using a computing device 300 as described in more detail below with respect to FIG. 3. Ways to implement stages of method 200 will be described in greater detail below. Method 200 may begin at starting block 205 and proceed to stage 210 where computing device 300 may receive a plurality of records comprising addresses that RIA 105 is allowed to access. For example, a developer may determine that RIA 105 only needs to visit certain sites. Consequently, the developer may provide the plurality of records comprising addresses that RIA 105 is allowed to access. If the developer allows access to site 120, the address of site 120 is provided. If the developer does not allow access to site 120, the address of site 120 is not provided.

From stage 210, where computing device 300 receives the plurality of records comprising the addresses that RIA 105 is allowed to access, method 200 may advance to stage 220 where computing device 300 may place the received plurality of records in manifest 110. As described below in more detail, manifest 110 and RIA 105 may both reside on computing device 300.

RIA may include two files, manifest 110 and a main HTML document that may be specified in manifest 110. Manifest 110 may comprise an XML document that declares various RIA 105 properties including, for example, the name of the main HTML document to load on startup. The main HTML document may be present on computing device 300 and exist in a same directory as manifest 110. If either manifest 110 or the main HTML document is missing or inaccessible, RIA 105 may fail to execute and may show the user an appropriate error message.

Once computing device 300 places the received plurality of records in manifest 110 in stage 220, method 200 may continue to stage 230 where computing device 300 may receive a request containing an address. For example, during execution of RIA 105, the code may point to a site that RIA 105 should connect with. This code may comprise a script, a control used by a web page, or even malicious code. Embodiments of the invention may include cross site navigation restrictions. For example, operating environment 100 may guard against privilege elevation situations and should not be abused as a general purpose web browser. All navigation links pointing outside of the main HTML document may be executed out of process with respect to RIA 105 to achieve this goal. This may mean, for example, launching Internet Explorer to handle these navigation requests. Navigation links pointing within RIA 105 (perhaps to different sections of a document) may work as expected, taking the user to that portion of the main HTML document.

After computing device 300 receives the request containing the address in stage 230, method 200 may proceed to decision block 240 where computing device 300 may compare the received address to the plurality of records in manifest 110. As will described in more detail below, "wildcards" maybe used in representing a portion of the plurality of records.

Conventional SOP states, for example, that JavaScript code running on a web page may not interact with any resource not originating from the same web site. The reason this security policy exists is to prevent malicious web coders from creating pages that steal web users' information or compromise their privacy. This conventional policy also has the side effect of making web development difficult. Since RIAs are invoked from a local device, a browser origin may be set to "localhost" by default. While this is fine for disconnected applications, it may create problems for those that need to access network resources because those requests may fail conventional SOP. Consistent with embodiments of the invention, a declared origin policy may provide that RIA 105 may declare all origin sites in manifest 110. This list may be checked whenever an SOP policy would be enforced and the requests that match the list may be allowed to go through. Requests that fall outside the list may be blocked as in the conventional SOP case.

For example, RIA 105 may contact the gasbuddy.com web service to retrieve gas prices for a given city. Consequently, RIA 105's developer may add the following domain to manifest 110:

gasbuddy.com

In a more complex example, RIA 105 may display a map of a given city using the maps.live.com APIs. These APIs contact several map tile servers across different subdomains of maps.live.com and virtualearth.net:

maps.live.com
st1.maps.live.com
st2.maps.live.com
r0.ortho.tiles.virtualearth.net
r1.ortho.tiles.virtualearth.net In this case, RIA 105's developer may add the following domains to manifest 110:

\*.maps.live.com
\*.tile.virtualearth.net

Note that asterisks (i.e. wildcards) are used to save the developer from listing out each and every domain/subdomain. Specifically, a valid domain entry may be either: i) a domain name (i.e. foo.com); or ii) a single asterisk followed by a period and a valid domain name/suffix consisting of at least two non-wildcard tokens. Below are some examples of valid entries:

foo.com
    *.foo.com
    *.foo.bar.com
    *.domain.co.uk

Below are some examples of invalid entries:

*foo.com [asterisk not followed by a period]
    *.com [has only one token after the asterisk]
    * [asterisk not followed by a period]
    . [not a valid domain name]
    .com [not a valid domain name]

From decision block 240, if computing device 300 determines that one of the plurality of records in manifest 110 matches the address, method 200 may advance to stage 250 where computing device 300 may allow access to the address. For example, if anything in RIA 105's process (script, controls used by the web page, malicious code that an attacker got onto a system, etc.) attempts to contact (i.e. requested) site 120, operating system 115 may allow the request if site 120 is listed in manifest 110. As described above, wild cards may be considered in the plurality of records in manifest 110 when determining when one of the plurality of records in manifest 110 matches the address. For example, a wild card may be used in place of a website name, a protocol, or a port.

From decision block 240, if computing device 300 determines that an ambiguity is encountered as to whether the one of the plurality of records in manifest 110 matches the address, method 200 may advance to stage 260 where computing device 300 may allow access to the address. For example, in the case of ambiguity, the declared origin policy, consistent with embodiments of the invention, may err on the side of being more permissive by default. For example, in the list below as continued from the above example, requests to any subdomain off of live.com (including requests direct to live.com) may pass:

live.com
    *.live.com

From decision block 240, if computing device 300 determines that none of the plurality of records in manifest 110 matches the address, method 200 may advance to stage 270 where computing device 300 may deny access to the address. For example, if anything in RIA 105's process (script, controls used by the web page, malicious code that an attacker got onto a system, etc.) attempts to contact (i.e. requested) site 120, operating system 115 may deny the request if site 120 is not listed in manifest 110. As described above, wild cards may be considered in the plurality of records in manifest 110 when determining when one of the plurality of records in manifest 110 matches the address. For example, a wild card may being used in place of a website name, a protocol, or a port.

From stage 250, stage 260, or stage 270, method 200 may advance to stage 280 where computing device 300 may deny any request to change any of the plurality of records in manifest 110. For example, RIA 105 may be updated, uninstalled, and reinstalled. In this case, as an added security feature, any request to change any of the plurality of records in manifest 110 may be denied when RIA 105 is updated, uninstalled, and reinstalled. Once computing device 300 denies any request in stage 280, method 200 may then end at stage 290.

An embodiment consistent with the invention may comprise a system for providing a declared origin policy. The system may comprise a memory storage and a processing unit coupled to the memory storage. The processing unit may be operative to receive a request containing an address and compare the received address to a plurality of records in a manifest. Then the processing unit may allow access to the address when a one of the plurality of records in the manifest matches the address and deny access to the address when none of the plurality of records in the manifest matches the address.

Another embodiment consistent with the invention may comprise a system for providing a declared origin policy. The system may comprise a memory storage and a processing unit coupled to the memory storage. The processing unit may be operative to receive a plurality of records comprising addresses that an application is allowed to access. The processing unit may then place the received plurality of records in a manifest. The manifest and the application may reside on a same computing device. The processing unit may then receive a request containing an address and compare the received address to the plurality of records in the manifest. Next the processing unit may: i) allow access to the address when a one of the plurality of records in the manifest matches the address; ii) allow access to the address when an ambiguity is encountered as to whether the one of the plurality of records in the manifest matches the address; and iii) deny access to the address when none of the plurality of records in the manifest matches the address. The processing unit may also deny any request to change any of the plurality of records in the manifest when the application is updated, uninstalled, or reinstalled.

Yet another embodiment consistent with the invention may comprise a system for providing a declared origin policy. The system may comprise a memory storage and a processing unit coupled to the memory storage. The processing unit may be operative to receive a plurality of records comprising addresses that an application is allowed to access and place the received plurality of records in the manifest. Then the processing unit may receive a request containing an address from the application that is requesting access to the address. The application may comprise, for example, a script, a control used by a web page, or malicious code. Next, the processing unit may compare the received address to the plurality of records in the manifest. The processing unit may then allow access to the address when a one of the plurality of records in the manifest matches the address. At least one wild card in the plurality of records in the manifest may be considered when determining when the one of the plurality of records in the manifest matches the address. The at least one wild card may be used in place of a website name, a protocol, or a port. The processing unit may allow access to the address when an ambiguity is encountered as to whether the one of the plurality of records in the manifest matches the address or deny access to the address when none of the plurality of records in the manifest matches the address. Any request to change any of the plurality of records in the manifest may be denied by the processing unit when the application is updated, uninstalled, or reinstalled.

Figure 3:
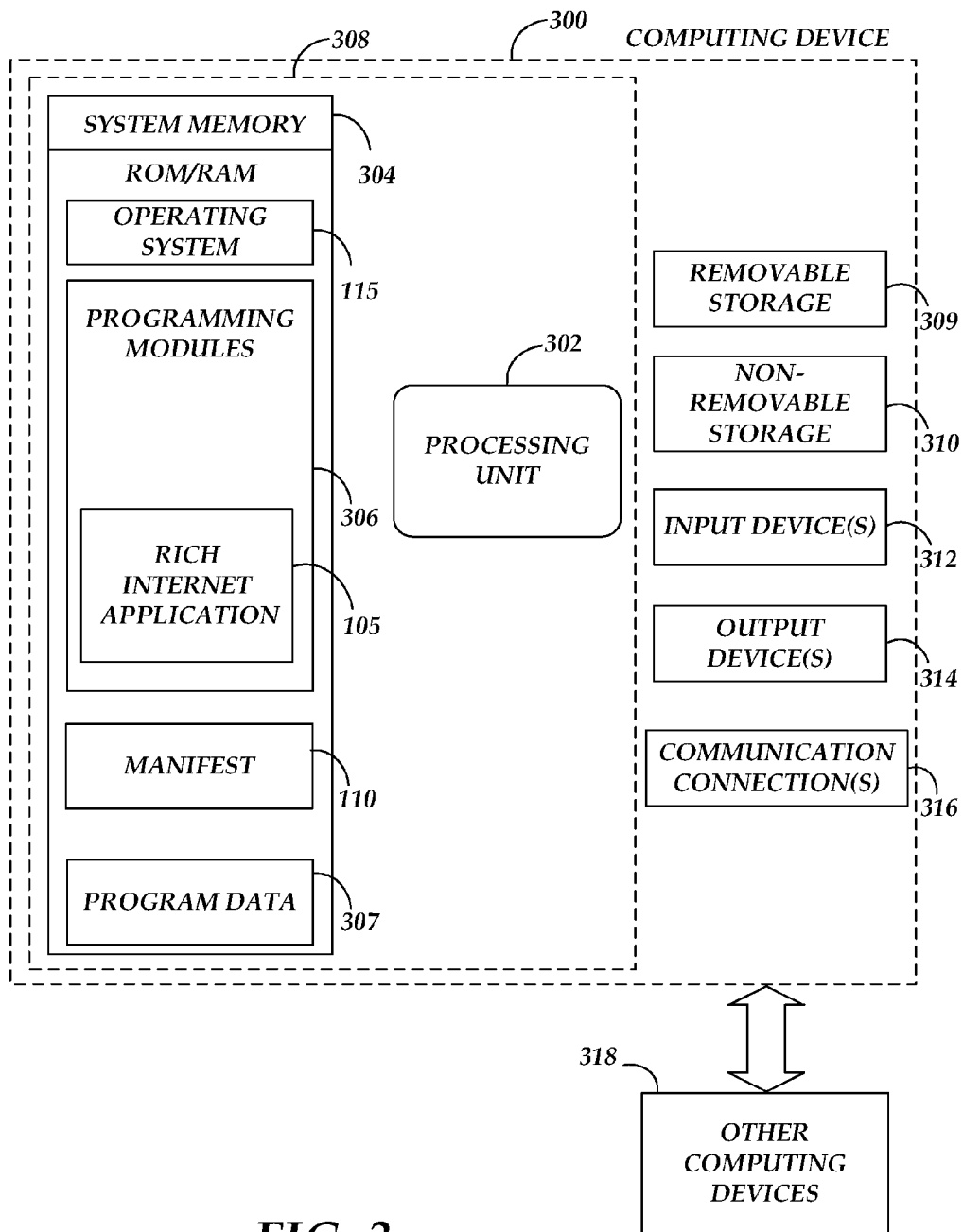
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. Site 120 may comprise one of other computing devices 318. The aforementioned system, device, and processors are examples and other systems, devices, and processors may comprise the aforementioned memory storage and processing unit, consistent with embodiments of the invention. Furthermore, computing device 300 may comprise an operating environment for environment 100 as described above. Operating environment 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 115, one or more programming modules 306, may include a program data 307, and may include manifest 110. Operating system 115, for example, may be suitable for controlling computing device 300's operation. In one embodiment, programming modules 306 may include, for example, RIA 105. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

Computing device 300 may also contain a communication connection 316 that may allow device 300 to communicate with other computing devices 318, such as over a network in a distributed computing environment, for example, an intranet or the Internet. Communication connection 316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 304, including operating system 115. While executing on processing unit 302, programming modules 306 (e.g. RIA 105) may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a declared origin policy, the method comprising:
receiving a request containing an address, wherein receiving the request containing the address comprises receiving the request containing the address from an application that is requesting access to the address, wherein the application comprises at least one of the following: a script, a control used by a web page, and malicious code;
comparing the received address to a plurality of records in a manifest, the manifest specifying a rich internet application, at least one property of the rich internet application, and a startup website to load for the rich internet application;
allowing, by a computing device, access to the address when a one of the plurality of records in the manifest matches the address, the allowed address being denied cross site navigational privileges, wherein allowing access to the address when the one of the plurality of records in the manifest matches the address comprises considering at least one wild card in the plurality of records in the manifest when determining when the one of the plurality of records in the manifest matches the address, the at least one wild card being used in place of a port; and
denying, by the computing device, access to the address when none of the plurality of records in the manifest matches the address.

2. The method of claim 1, wherein comparing the received address to the plurality of records in the manifest comprises comparing the received address to the plurality of records in the manifest wherein wildcards are used in representing a portion of the plurality of records.

3. The method of claim 1, wherein allowing access to the address when the one of the plurality of records in the manifest matches the address comprises considering wild cards in the plurality of records in the manifest when determining when the one of the plurality of records in the manifest matches the address.

4. The method of claim 1, wherein allowing access to the address when the one of the plurality of records in the manifest matches the address comprises considering the at least one wild card in the plurality of records in the manifest when determining when the one of the plurality of records in the manifest matches the address, the at least one wild card being used in place of a website name.

5. The method of claim 1, wherein allowing access to the address when the one of the plurality of records in the manifest matches the address comprises considering the at least one wild card in the plurality of records in the manifest when determining when the one of the plurality of records in the manifest matches the address, the at least one wild card being used in place of a protocol.

6. The method of claim 1, wherein denying access to the address when none of the plurality of records in the manifest matches the address comprises considering wild cards in the plurality of records in the manifest when determining when none of the plurality of records in the manifest matches the address.

7. The method of claim 1, wherein denying access to the address when none of the plurality of records in the manifest matches the address comprises considering the at least one wild card in the plurality of records in the manifest when determining when none of the plurality of records in the manifest matches the address, the at least one wild card being used in place of a website name.

8. The method of claim 1, wherein denying access to the address when none of the plurality of records in the manifest matches the address comprises considering the at least one wild card in the plurality of records in the manifest when determining when none of the plurality of records in the manifest matches the address, the at least one wild card being used in place of a protocol.

9. The method of claim 1, wherein denying access to the address when none of the plurality of records in the manifest matches the address comprises considering the at least one wild card in the plurality of records in the manifest when determining when none of the plurality of records in the manifest matches the address, the at least one wild card being used in place of the port.

10. The method of claim 1, further comprising denying any request to change any of the plurality of records in the manifest when an application is one of updated, uninstalled, and reinstalled.

11. The method of claim 1, further comprising allowing access to the address when an ambiguity is encountered as to whether the one of the plurality of records in the manifest matches the address.

12. The method of claim 1, further comprising:
receiving the plurality of records comprising addresses that an application is allowed to access; and
placing the received plurality of records in the manifest.

13. The method of claim 12, wherein placing the received plurality of records in the manifest comprises placing the received plurality of records in the manifest wherein the manifest and the application reside on a same computing device.

14. A computer-readable storage device which stores a set of instructions which when executed performs a method for providing a declared origin policy, the method executed by the set of instructions comprising:
receiving a plurality of records comprising addresses that an application is allowed to access;
placing the received plurality of records in a manifest, wherein placing the received plurality of records in the manifest comprises placing the received plurality of records in the manifest wherein the manifest and the application reside on a same computing device, the manifest specifying the application, at least one property of the application, and a website to load for the application;
receiving a request containing an address, wherein receiving the request containing the address comprises receiving the request containing the address from an application that is requesting access to the address, wherein the application comprises at least one of the following: a script, a control used by a web page, and malicious code;
comparing the received address to the plurality of records in the manifest;
allowing access to the address when a one of the plurality of records in the manifest matches the address, the allowed address being restricted from cross site navigation, wherein allowing access to the address when the one of the plurality of records in the manifest matches the address comprises considering at least one wild card in the plurality of records in the manifest when determining when the one of the plurality of records in the manifest matches the address, the at least one wild card being used in place of a port;
allowing access to the address when an ambiguity is encountered as to whether the one of the plurality of records in the manifest matches the address;
denying access to the address when none of the plurality of records in the manifest matches the address; and
denying any request to change any of the plurality of records in the manifest when the application is one of updated, uninstalled, and reinstalled.

15. The computer-readable storage device of claim 14, wherein denying access to the address when none of the plurality of records in the manifest matches the address comprises considering the at least one wild card in the plurality of records in the manifest when determining when none of the plurality of records in the manifest matches the address, the at least one wild card being used in place of at least one of the following: a website name, a protocol, and the port.

16. A system for providing a declared origin policy, the system comprising:
a memory storage; and
a processing unit coupled to the memory storage, wherein the processing unit is operative to:
receive a plurality of records comprising addresses that an application is allowed to access;
place the received plurality of records in a manifest, the manifest specifying a rich internet application, at least one property of the rich internet application, and a startup website to load for the rich internet application;
receive a request containing an address from the application that is requesting access to the address wherein the application comprises at least one of the following: a script, a control used by a web page, and malicious code;
compare the received address to the plurality of records in the manifest;
allow access to the address when a one of the plurality of records in the manifest matches the address wherein the processing unit being operative to allow access comprises the processing unit being operative to:
deny the allowed address cross site navigational privileges, and
consider at least one wild card in the plurality of records in the manifest when determining when the one of the plurality of records in the manifest matches the address, the at least one wild card being used in place of at least one of the following: a website name, a protocol, and a port;
allow access to the address when an ambiguity is encountered as to whether the one of the plurality of records in the manifest matches the address;
deny access to the address when none of the plurality of records in the manifest matches the address; and
deny any request to change any of the plurality of records in the manifest when the application is one of updated, uninstalled, and reinstalled.

* * * * *